Feb. 25, 1947.  E. H. LAND  2,416,528
COMBINED TICKET STRIP AND VIEWING VISOR
Filed March 13, 1942

INVENTOR.
Edwin H. Land
BY Donald L. Brown
Attorney

Patented Feb. 25, 1947

2,416,528

UNITED STATES PATENT OFFICE 2,416,528

COMBINED TICKET STRIP AND VIEWING VISOR

Edwin H. Land, Cambridge, Mass., assignor to Polaroid Corporation, Cambridge, Mass., a corporation of Delaware Application March 13, 1942, Serial No. 434,567

2 Claims. (Cl. 88—29)

This invention relates to a combined admission ticket and viewing device.

An object of the invention is to provide a viewing device for use in connection with the viewing of stereoscopic pictures projected in polarized light which is in the form of a ticket of admission.

Other objects of the invention are to provide such a viewing device which is provided with a heavily perforated or scored section which may be removed by a ticket taker and which when removed provides a recess for the reception of the nose of an observer using the device; to provide such a viewing device which comprises a plurality of light-polarizing areas, one positioned before each eye of an observer; to provide such a viewing device in which the polarizing axes of the areas aforesaid are substantially at right angles to each other; to provide such a device in which the said polarizing axes of the polarizing areas are at angles of approximately 45° with a line joining the centers of said areas; to provide such a device which may be used as a viewing device from either side without alteration in the stereoscopic effect produced; and to provide such a combined ticket of admission and viewing device as one of a multiplicity of such devices in a strip or roll thereof from which the devices may be readily removed by a ticket vendor.

Other objects of the invention will in part be obvious and will in part appear hereinafter.

The invention accordingly comprises an article of manufacture possessing the features, properties, and the relation of elements which will be exemplified in the article hereinafter described and the scope of the application of which will be indicated in the claims.

For a fuller understanding of the invention reference should be had to the following detailed description taken in connection with the accompanying drawings, wherein.

The use of polarized light in connection with the projection and viewing of stereoscopic images, and more particularly in connection with the projection and viewing of stereoscopic motion pictures, has heretofore been suggested. In all such processes a plurality of images are thrown upon a screen or formed thereon, one image being formed in polarized light vibrating in a predetermined direction, and the other image being formed in differently polarized light, for example in light vibrating at right angles to the direction of vibration of the polarized light carrying the first-mentioned image. The images are usually thrown on the screen in substantially superimposed relation. A person viewing the images is provided with a viewing visor or viewing glasses which are equipped with light-polarizing elements, one positioned in front of each eye of the observer. Such systems generally have been described in several previously issued United States Letters Patent and are explained in greater detail in the patent to Land and Mahler, No. 2,203,687, issued June 11, 1940, for Apparatus employing polarized light for the production of stereoscopic images, and in the patent to Land, No. 2,099,694, issued November 23, 1937, for Polarizing optical system. Various forms of devices have been suggested. In one form circularly polarized light is employed. In another the light beams carrying one image vibrate horizontally, and those carrying the other image vibrate perpendicularly. In still a third form the light rays carrying each image vibrate at angles of substantially 45° to the horizontal and at right angles to each other. The present invention is intended for use in connection with all of these methods of projection.

Figure 1:
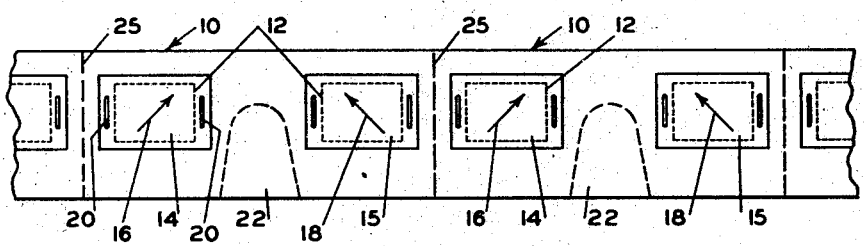
Figure 1 represents diagrammatically and in plan a portion of a strip comprising a plurality of admission tickets embodying one form of the present invention.

In the embodiment of the invention shown in Fig. 1, frame 10, which may be of heavy paper, cardboard or other fairly stiff and self-supporting material, is provided with a pair of eye apertures 12 the centers of which are positioned at substantially the average interocular distance from each other, and these apertures are covered with light-polarizing elements 14, 15, which may advantageously comprise one of the light-polarizing materials sold under the trade name "Polaroid." In this embodiment of the invention, elements 14 and 15 are so positioned in the viewing device that their axes are substantially at angles of 45° to the horizontal when the device is in position before the eyes of an observer, as is indicated by arrows 16 and 18. It will be understood, however, that the invention is in no way limited to this arrangement, and that elements 14 and 15 may, for example, have their axes respectively parallel and perpendicular to a line connecting the centers of apertures 12. Elements 14 and 15 may be fastened to the frame 10 in any desired way as by means of an adhesive or staples, rivets or the like 20.

Centrally disposed between the light-polarizing elements and adjacent one edge of the viewing device, there may be provided a section 22 which is heavily scored or perforated and which is of such size and shape that when it is removed the recess which remains in the viewing device will approximately fit over the nose of a person using the device. This heavily scored section 22 may be employed as the portion of the combined ticket and viewing device which is to be surrendered to the ticket-taker when the user of the device enters a theatre, and it may if desired be provided with a serial number, which may also appear upon the main body of the viewing device to serve as identification.

Successive viewing devices of the type described may be joined into a strip or roll, as shown for example in the drawing, and may be separated from each other by weakened or scored lines 25. The roll may thus serve as a roll of tickets and the viewing devices may be easily separated therefrom and passed to purchasers thereof in the way in which tickets are now sold from rolls.

Figure 5:
Fig. 5 is a diagrammatic view of a strip such as is shown in one of the preceding figures in position for being dispensed.
Figure 6:
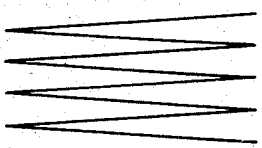
Fig. 6 is a similar view of such a strip but in a different position for being dispensed.

Such a roll of tickets is shown, for example, in Fig. 5. The ticket strip shown in Figs. 1, 2 and 3 may also be adapted to be folded in an accordion fold for dispensing, and such a fold is shown diagrammatically in Fig. 6.

It will be noted that the viewing device of the character described may be employed by an observer with either surface adjacent the eyes, for reversal of the device, so that the observer looks through the opposite surface, causes no alteration in the relative positions of the polarizing axes of the elements 14 and 15. The entire device is light, thin, easily handled, easily assembled, and cheap. There is no need to instruct the user as to how the device is to be handled, or how it is to be used, whereas with devices of the same general type that have heretofore been employed it is only possible for the observer to look through the devices from one surface without losing the stereoscopic effect which is desired.

It will of course be understood that the general shape and form of the ticket may be altered as desired. In its simplest form it may comprise a substantially straight strip, as shown in the drawing. In more complex forms it may be shaped to represent some object which is being advertised, such for example as an automobile, in which case the light-polarizing elements may be positioned to overlie the headlights of the automotive vehicle represented. All such modifications of appearance are to be deemed to fall within the scope of the invention.

Figure 2:
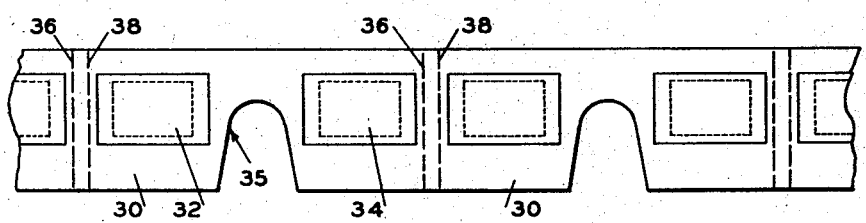
Fig. 2 is a similar view of a portion of a strip comprising a plurality of admission tickets embodying a different form of the invention.

In a modified form of the invention shown, for example, in Fig. 2, the ticket strip may be formed of a thin but self-supporting plastic sheet 30, for example a sheet of cellulose acetate or like material. The apertures in this sheet may be positioned as previously described in connection with the device shown in Fig. 1, and polarizing elements 32, 34 may be the full equivalents of elements 14 and 15 of Fig. 1. In the form of the device shown in Fig. 2, however, it is particularly easy to cement or bond elements 32 and 34 to strip 30. This may be done by applying a common solvent to the surfaces of the strip and polarizing elements which are in contact, and under these circumstances staples 20 may be dispensed with. It will be apparent that if sheet 30 comprises transparent material no apertures will be needed therein.

In either of the embodiments of the invention shown in Figs. 1 and 2, scored section 22, described as a portion to be surrendered as a ticket, may be dispensed with, so that the device may be pre-sheeted to fit upon the nose of a viewer, as shown for example at 35 in Fig. 2. Under these circumstances it may, however, be desirable to provide a supplemental scored strip to be surrendered as a ticket identification strip, and such a strip may be provided by means of a double score line 36, 38 at the end of each individual viewing device. Under these circumstances it will be understood that one of each of the pairs of score lines, for example score line 36, acts to separate successive viewing units, and the other of the pair of score lines, for example score line 38, acts merely as a supplemental tear line so that the ticket taker may remove the section set off by this score line from the remainder of the viewing device.

Figure 3:
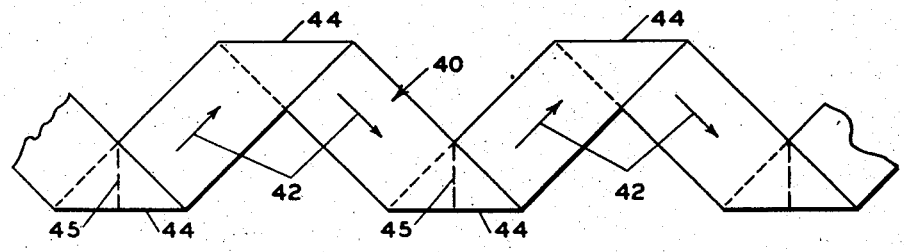
Fig. 3 is a similar view of a still further modification of the invention.

In Fig. 3 there is shown a still further modification of the invention. In this form the ticket strip is made up of a single fairly heavy self-supporting sheet or strip of light-polarizing material 40. The polarizing axis of this material is indicated by arrows 42. The strip is folded upon itself, as for example along the lines 44, to provide a succession of inclined areas extending substantially at 90° to each other, each area being a light-polarizing area and the polarizing axes of successive areas being substantially at right angles to each other. Heavy score lines 45 may be provided intermediate adjacent pairs of these polarizing areas so that the strip may be separated into a plurality of viewing units by tearing along the score lines. The overlying portions of the strip, for example the portions adjacent fold lines 44, may be adhesively bonded together in any well-known manner in order to effect a more compact and unitary structure. Under these circumstances, the unit lying between successive score lines 45 is adapted to function as a viewing device for stereoscopic pictures exactly as are the units of the devices described in connection with Figs. 1 and 2.

Figure 4:
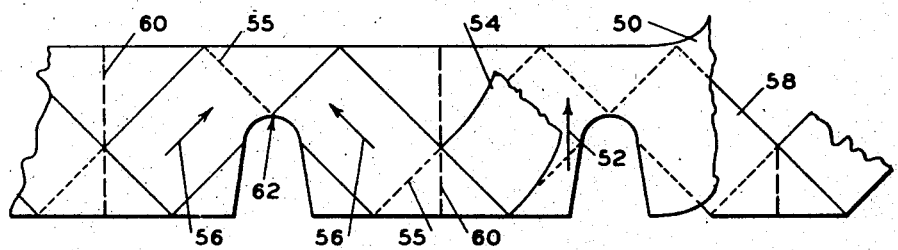
Fig. 4 is a similar view of a different type of strip wherein the combined tickets and viewing devices are of a somewhat modified form.

In Fig. 4 there is shown a still further modification of the invention which is adapted, for example, for use in connection with the projection of stereoscopic images in circularly polarized light where one image is given a clockwise circular polarization and the other a counterclockwise circular polarization. In the form of the device shown in Fig. 4, the ticket strip may comprise a three-ply lamination. The central ply 50 may be a strip of light-polarizing material, such as one of the polarizing materials sold under the trade name "Polaroid," or any other suitable sheet-like polarizing material, and it may have its axis positioned in any direction, as shown for example by arrow 52.

On one face of polarizing strip 50 there may be positioned separate quarter-wave retardation devices, one to overlie each eye of an observer, or the entire face of the polarizing strip may be laminated as shown to a quarter-wave retardation device, for example a sheet 54 of strained cellulose acetate or quarter-wave Cellophane. Sheet 54 should be folded upon itself in the same manner as sheet 40 in Fig. 3, as indicated by dotted lines 55, or otherwise so arranged that its principal optical direction over one eye of an observer is at an angle of 45° to the axis of polarizing sheet 50, and its principal optical direction over the other eye of the observer is at a similar angle of 45° but in the reverse direction to the axis of sheet 50. In Fig. 4, the principal optical direction of sheet 54 is designated by arrows 56, which lie at angles of substantially 45° to axis 52 of sheet 50 and at angles of substantially 90° to each other. This change in direction is accomplished by the folding of the sheet. It is to be understood, of course, that separate quarter-wave elements may be used instead of a continuous sheet. The other face of sheet 50 may be similarly covered with a similar quarter-wave device 58, as indicated in Fig. 4. The separate ticket units of the device may be separated from each other by the heavily scored line 60 so as to provide a series of successive ticket elements. It will be understood, moreover, that nose apertures 62 may be of any desired shape besides that shown, and that if desired, polarizing sheet 50 may be cut to the same shape as sheets 54 and 58.

It will be understood that in the operation of the device shown in Fig. 4, the quarter-wave device or devices which lie on the outer side of sheet 50 act in conjunction with that sheet to convert the device into circularly polarizing viewing means for analyzing circularly polarized light projected from a screen, whereas the quarter-wave devices lying intermediate the polarizing sheet and the eyes of the observer have no effect upon the function of the device. It should be noted that a similarly operating device may be made similar to the device shown in Fig. 2, by utilizing for sheet 30 a material which will act as a quarter-wave device, with its principal optical direction at right angles to the horizontal. By using a second such sheet overlying the polarizing elements, the device may be made operative from either side. In such an embodiment of the invention it will be apparent that no eye apertures will be formed in either quarter-wave sheet.

Other modifications of the above described embodiments of the invention may be made by suitable combinations of polarizing material and half-wave retardation material. For example, sheet 30 in Fig. 2 may be assumed to be a sheet of light-polarizing material of uniform polarization characteristics, and it may be converted to use in accordance with the invention by putting a single piece of half-wave material, for example element 34, over one of the two eye portions in each viewer section and with its principal optical direction at an angle of 45° to the axis of the polarizing material. As another example, a sheet of half-wave material may be folded in the same manner as sheet 40 in Fig. 3 around a sheet of light-polarizing material. That is to say, the half-wave material may be wrapped around, as it were, the light-polarizing material. When such an embodiment is in use it will be understood that the half-wave material between the polarizer and the eye of the user will have no effect upon the function of the device. In both of these embodiments of the invention, moreover, it will be apparent that there will be no eye apertures formed in the light-polarizing material or the half-wave material.

Each modification of the invention which has been described above may be used as a suitable viewing device with either surface thereof adjacent the eyes of an observer. While this is a preferred form of structure embodying the present invention, it is to be understood that modified devices which utilize other elements of the invention and which fall within the scope of the claims are to be deemed to fall within the scope of the invention.

Since certain changes may be made in the above article and different embodiments of the invention could be made without departing from the scope thereof, it is intended that all matter contained in the above description or shown in the accompanying drawing shall be interpreted as illustrative and not in a limiting sense.

What is claimed is:

1. As a new article of manufacture, a strip comprising a multiplicity of detachably connected units, each unit comprising in combination a viewing visor and a ticket identification element detachably affixed thereto, each said visor comprising thin, sheet-like, self-supporting frame means and means providing a light-polarizing area before each eye of a user of said visor, each of said light-polarizing areas being adapted to transmit light substantially blocked by the other thereof, said ticket identification element comprising a portion of said frame means which when detached from said visor provides in said frame a nose-receiving recess.

2. A combined ticket of admission and viewing visor comprising, in combination, thin, sheet-like, self-supporting frame means and means providing a light-polarizing area for each eye of a user of said visor, each of said light-polarizing areas being adapted to transmit light substantially blocked by the other thereof, and means providing a ticket identification element detachably affixed to said visor, said ticket identification element, comprising a portion of said frame means which when detached from said visor, provides in said frame a nose-receiving recess.

EDWIN H. LAND.

REFERENCES CITED

The following references are of record in the file of this patent:

UNITED STATES PATENTS

| Number | Name | Date |
|---|---|---|
| 2,084,350 | Land | June 22, 1937 |
| 2,018,214 | Land | Oct. 22, 1935 |
| 1,968,193 | Elinson | July 31, 1934 |
| 2,099,694 | Land | Nov. 23, 1937 |
| 1,533,437 | Macy | Apr. 14, 1925 |
| 2,032,139 | Macy | Feb. 25, 1936 |
| 1,879,793 | Chubb | Sept. 27, 1932 |
| 1,503,766 | Pictet et al. | Aug. 5, 1924 |
| 1,548,262 | Freedman | Aug. 4, 1925 |
| 2,187,685 | Freedman | Jan. 16, 1940 |
| 426,503 | Keller | Apr. 29, 1890 |
| 2,273,434 | Burchell | Feb. 17, 1942 |
| 2,179,286 | English | Nov. 7, 1939 |
| 2,218,875 | Parsell | Oct. 22, 1940 |
| 771,591 | Wagner | Oct. 4, 1904 |

FOREIGN PATENTS

| Number | Country | Date |
|---|---|---|
| 340,661 | French | May 18, 1904 |
| 363,079 | Italian | Sept. 16, 1938 |
| 517,924 | British | Feb. 13, 1940 |